(12) United States Patent
Yamashita

(10) Patent No.: US 7,352,959 B2
(45) Date of Patent: Apr. 1, 2008

(54) MOVING PICTURE REPRODUCING DEVICE AND MOVING PICTURE REPRODUCING METHOD

(75) Inventor: Koichiro Yamashita, Higashiyamato (JP)

(73) Assignee: Fujitsu Limited, Kawasaki (JP)

( * ) Notice: Subject to any disclaimer, the term of this patent is extended or adjusted under 35 U.S.C. 154(b) by 1189 days.

(21) Appl. No.: 10/629,739

(22) Filed: Jul. 30, 2003

(65) Prior Publication Data

US 2004/0022525 A1 Feb. 5, 2004

(30) Foreign Application Priority Data

Jul. 31, 2002 (JP) ............................. 2002-224100
Mar. 31, 2003 (JP) ............................. 2003-097496
Jul. 9, 2003 (JP) ............................. 2003-194149

(51) Int. Cl.
*H04N 5/917* (2006.01)
(52) U.S. Cl. ...................... 386/111; 386/109; 386/125; 375/240.13
(58) Field of Classification Search .................. 386/45, 386/46, 50, 85, 73, 109, 111, 112, 120, 121, 386/125, 126; 375/240.12, 240.13, 240.15
See application file for complete search history.

(56) References Cited

U.S. PATENT DOCUMENTS 5,636,036 A * 6/1997 Ashbey ........................ 386/45
5,819,004 A * 10/1998 Azadegan et al. ........... 386/112
6,108,486 A * 8/2000 Sawabe et al. .............. 386/126
6,337,883 B1 1/2002 Tanaka
6,564,009 B2 * 5/2003 Owa et al. ................... 386/126
6,701,060 B2 * 3/2004 Yuen et al. .................... 386/46

FOREIGN PATENT DOCUMENTS

JP 11-355728 12/1999

* cited by examiner

*Primary Examiner*—John Miller
*Assistant Examiner*—Christopher Onuaku
(74) *Attorney, Agent, or Firm*—Staas & Halsey LLP

(57) ABSTRACT

The moving picture reproducing device to decode frames of moving picture data and synchronously output decoded moving picture data based on time information given to each frame, and to count up the number of frames from a first frame up to a second frame. The first frame is given the time information and appears first toward the positive direction of time axis from a predetermined intermediate seek position in the data stream. The second frame appears first after a key frame which is not given the time information and appears first toward the positive direction of time axis from the intermediate seek position. The time information of the key frame is thereby interpolated based on the time information of the first frame and the counted number of frames to reduce the extent of decoding processing and buffering during reproducing a MPEG moving picture data stream when the reproducing is performed from an optional intermediate seek position.

29 Claims, 18 Drawing Sheets

PRIOR ART

|  | MPEG reproducing software of the present invention | Related reproducing device A (application on multipurpose PC) | Related reproducing device B (hardware mounted as ASIC) |
| --- | --- | --- | --- |
| Regular reproduction of MPEG moving picture | Corresponding to an optional moving picture data | Corresponding to an optional moving picture data | Corresponding to a particular moving picture data |
| Special reproduction of MPEG moving picture | Corresponding to an optional moving picture data | Corresponding to an optional moving picture data | Corresponding to a particular moving picture data |
| Memory used (Data of QVGA is used) | 500KByte or less | About 10Mbyte | About 2Mbyte (outside ASIC) |
| Cycle of arithmetic device used | About 200MHz About 500mW | About 400MHz About 2W | . . . |
| Merit | High flexibility Resource of CPU and memory is not wasted | High flexibility | Resource of memory is not wasted |
| Demerit | Interpolation corresponding to all frames and all picture types is impossible | High flexibility is realized by wasting resource of CPU and memory | Low flexibility due to mounted hardware |

MOVING PICTURE REPRODUCING DEVICE AND MOVING PICTURE REPRODUCING METHOD

CROSS-REFERENCE TO RELATED APPLICATIONS

This application is based upon and claims the benefit of priority from the prior Japanese Patent Application Nos. 2002-224100, 2003-97496 and 2003-194149, filed on Jul. 31, 2002, Mar. 31, 2003 and Jul. 9, 2003, respectively, the entire contents of which are incorporated herein by reference.

BACKGROUND OF THE INVENTION

1. Field of the Invention

The present invention relates to a moving picture reproducing device and particularly to an MPEG (Moving Picture Experts Group) moving picture reproducing module.

2. Description of the Related Art

Conventionally, an MPEG moving picture reproducing module, which can be incorporated as a module as part of a whole system, is used in a moving picture producing device for a particular data stream, as illustrated in FIG. 1. Due to a preference for compactness of such modules, there is typically limited memory made available and the modules typically operate at a low cycle speed for low power consumption. The particular data stream is generated by a moving picture generating device (moving picture generating device A in FIG. 1) which generates the data stream with an ISO control code (control code structure A in FIG. 1) having a particular arrangement. Such MPEG moving picture reproducing modules may be realized, for example, as software, recorded on media as computer readable code, incorporated in a larger recording and/or reproducing apparatus, or encapsulated as a standalone MPEG reproducing device.

MPEG moving picture reproducing modules conventionally define a particular data stream as a reproduction object. MPEG moving picture reproducing modules do not analyze data streams based on the ISO control code, but rather base the reproduction of the data stream on expected particular arrangements of a data stream frame ISO control code which is anticipated to be received. Therefore, the MPEG moving picture reproducing modules can be encapsulated as compact software or elements, e.g., a arithmetic device, memory device, or the like).

As noted above, in such MPEG moving picture reproducing modules a data stream is generally defined as a reproduction object, with the data stream also including a picture size of one frame, frame rate, M value (appearing pattern period of key frame), N value (appearing pattern period of both-way reference frame) and insertion interval of PTS (Presentation Time Stamp) code, which is the synchronous output control code described with a particular pattern.

Meanwhile, according to the ISO standard, an ISO control code (parameter) such as the picture size, frame rate, M value, N value and PTS can be set freely within a range of values specified by the ISO standard. Thus, a multipurpose MPEG moving picture reproducing device as illustrated in FIG. 2 reproduces data streams in which the ISO control code of each data stream can have different structures. The multipurpose MPEG moving picture reproducing device analyzes the data stream based on the ISO code and stacks the information obtained by the analysis in an information table in a predetermined memory space. Thereby, the moving picture reproducing device can realize the reproducing function of the different data streams.

In order to execute each operation, such as the analysis of a data stream and stacking of information described above, a more sophisticated resource, e.g. arithmetic device, memory device or the like, is used. Therefore, the reproducing function for differing data streams is generally realized in a device that includes an arithmetic device that can be operated at a high speed operation cycle and a memory that has sufficient capacity to stack information for the whole data stream, for example, a personal computer.

In addition, Japanese Patent Publication No. Hei 11-355728 discusses an audio/video synchronous reproducing process and discloses a technique for calculating a frame rate of video data using the PTS code without using the frame rate described in the video data.

Typically, in a reproducing operation where the reproducing process starts from an intermediate seek position, rather than the leading position of the data stream, the MPEG moving picture reproducing device typically executes the following processes.

First, the MPEG moving picture reproducing device will sequentially decode all continuous MPEG moving picture data from a leading position of the data stream while buffering such data in a memory device. In this case, the video data and audio data obtained as a result of a decoding process, up to the desired intermediate seek position from which the reproducing process is preferentially to be started, are not outputted, but rather merely rejected.

Next, when the decoding process reaches the predetermined intermediate seek position, the output of the reproduced video data and audio data, obtained as a result of the decoding process, is initiated. In this manner, the reproducing process is executed from the intermediate seek position of the data stream.

However, execution of this intermediate seek position reproducing process requires a decoding process of all continuous MPEG moving picture data from the leading position of a data stream. Therefore, such a process requires a large mount of data to be processed by the arithmetic device, within a certain period, and requires a large amount of data to be buffered by the memory device. Accordingly, a more sophisticated resource (arithmetic device, memory device or the like) must be used.

Therefore, MPEG moving picture reproducing devices which can perform such intermediate seek position reproduction processes generally require high speed arithmetic devices and large capacity memory devices, which have sufficient capacity to simultaneously buffer a large amount of data, for example a personal computer. Thus, there is a need for a MPEG moving picture reproducing device performing such functions while only requiring a limited memory capacity and a lower speed arithmetic device.

SUMMARY OF THE INVENTION

Accordingly, it is an aspect of the present invention to provide an MPEG moving picture reproducing device which can realize, in a reproducing module, a multipurpose reproducing function for a data stream having an optional ISO control code and a special reproducing processing function for executing reproduction from an intermediate seek position of the data stream with an arithmetic device of low speed operation cycle and low required memory capacity.

Additional aspects and advantages of the invention will be set forth in part in the description which follows and, in part, will be obvious from the description, or may be learned by practice of the invention.

To achieve the above and/or other aspects of the present invention, there is a moving picture reproducing apparatus for reproducing an inputted data stream of moving picture data including a plurality of frames, decoding each frame of the moving picture data and synchronously outputting the decoded moving picture data based on time information given to each frame, including a time information interpolation processing unit to count a number of frames from a first frame up to a second frame, and to interpolate time information of a key frame based on time information of the first frame and the counted number of frames, a decoding unit to decode and output moving picture data based on the interpolated time information of the key frame, wherein the first frame appears toward a positive direction of a time axis from a predetermined intermediate seek position in the data stream, and the second frame appears after the key frame, with the key frame not having time information and appearing first toward the positive direction of the time axis from the intermediate seek position.

Accordingly, another aspect of the present invention is that even if a reproducing operation is started from an optional intermediate seek position, a moving picture reproducing device is capable of realizing the special reproduction processing function without execution of unnecessary decoding process and buffering process by interpolating a predetermined time information to a key frame having no time information based on a relationship between a counted number of frames and time information of a reference frame having time information.

Therefore, the moving picture reproducing device can be realized with an arithmetic device of low speed operation cycle and a memory device with less required memory capacity because amount of arithmetic operations required within a constant period and amount of data buffered for a reproduction process are reduced from conventional systems. Accordingly, moving picture reproducing device can be sufficiently realized even in a reproducing module that is provided with only a compact resource configuration.

Moreover, a data stream of MPEG moving picture data including optional ISO control code structure can be reproduced with a compact structure of an arithmetic device of a low speed operation cycle and a memory device of low required memory capacity, not depending on a ISO control code structure of the MPEG moving picture data.

To achieve the above and/or other aspects of the present invention, there is provided a moving picture reproducing method for reproducing an inputted data stream of moving picture data including a plurality of frames, decoding each frame of the moving picture data and synchronously outputting the decoded moving picture data based on time information given to each frame, including time information interpolating by counting up a number of frames from a first frame up to a second frame, the first frame having time information and appearing toward a positive direction of a time axis from a predetermined intermediate seek position in the data stream, with the second frame not having time information and appearing after a key frame, the key frame appearing toward the positive direction of the time axis from the intermediate seek position, and interpolating the time information for the key frame based on the time information of the first frame and the counted number of frames.

To achieve the above and/or other aspects of the present invention, there is provided a computer program controlling a computer to execute a moving picture reproduction operation for an inputted data stream of moving picture data including a plurality of frames, decoding each frame of the moving picture data and synchronously outputting the decoded moving picture data based on time information given to each frame, the moving picture reproduction process including time information interpolating by counting up a number of frames from a first frame up to a second frame, the first frame having time information and appearing first toward a positive direction of a time axis from a predetermined intermediate seek position in the data stream, with the second frame not having time information and appearing after a key frame, the key frame appearing toward the positive direction of the time axis from the intermediate seek position, and interpolating the time information for the key frame based on the time information of the first frame and the counted number of frames.

To achieve the above and/or other aspects of the present invention, there is provided a reproducing device for a data stream, including an interpolation processing unit to interpolate a predetermined time information for a key frame, of the data stream, based time information for a reference frame, of the data stream and different from the key frame, and a counted number of frames between the reference frame and another frame of the data stream, and a decoding processing unit to output decoded video frames of the data stream, for an intermediate seek position of the data stream, based on the interpolated time information for the key frame.

Lastly, to achieve the above and/or other aspects of the present invention, there is also provided a medium including computer readable code controlling a computer to control the execution of aforementioned methods, or a medium including computer readable code controlling a computer to control the operation of the aforementioned apparatuses.

These, together with other aspects and/or advantages that will be subsequently apparent, reside in the details of construction and operation as more fully hereinafter described and claimed, reference being had to the accompanying drawings forming a part thereof.

BRIEF DESCRIPTION OF THE DRAWINGS

These and other aspects and advantages of the invention will become apparent and more readily appreciated from the following description of the preferred embodiments, taken in conjunction with the accompanying drawings of which:

FIG. 18 is a diagram comparing functions and used environmental resources of an MPEG moving picture reproducing device, according to an embodiment of the present invention, and a conventional MPEG moving picture reproducing device.

DESCRIPTION OF THE INVENTION

Figure 1:
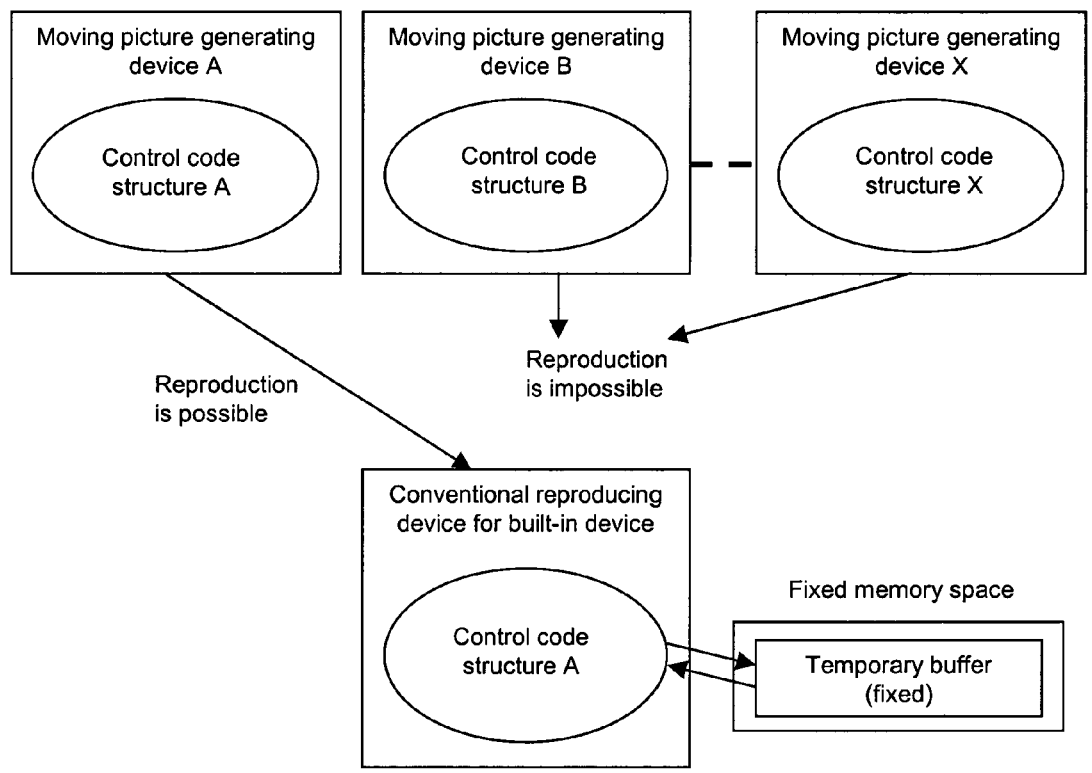
FIG. 1 is a diagram of a conventional MPEG moving picture reproducing module operation.

Reference will now be made in detail to the embodiments of the present invention, examples of which are illustrated in the accompanying drawings, wherein like reference numerals refer to like elements throughout. The embodiments are described below in order to explain the present invention by referring to the figures, while noting that embodiments of the present invention, and equivalents thereof, are not limited thereto.

Figure 3:
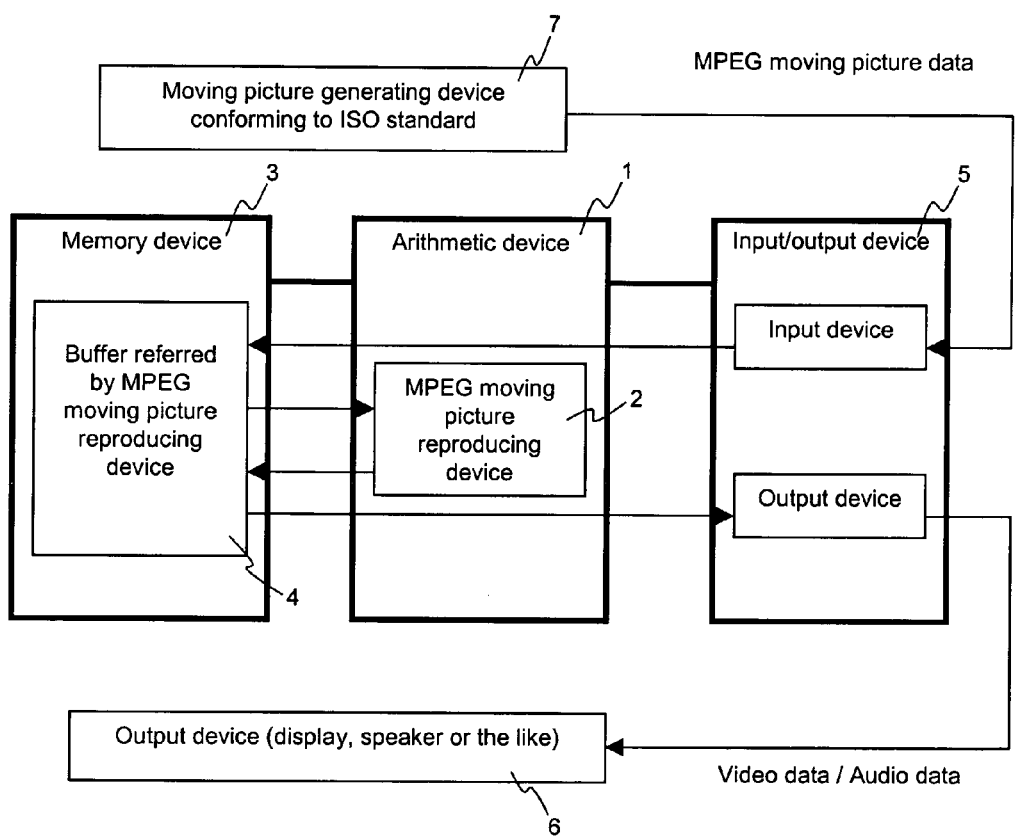
FIG. 3 is a diagram illustrating an MPEG moving picture reproducing module, according to an embodiment of the present invention.

FIG. 3 illustrates an MPEG moving picture reproducing module, according to an embodiment of the present invention. The MPEG moving picture reproducing module includes an arithmetic device 1, an MPEG moving picture reproducing device 2, a memory device 3, a buffer 4, an input/output device 5, an output device 6, and an MPEG moving picture generating device 7 conforming to the ISO standard.

Processes for generating and reproducing an MPEG moving picture will now be described, in reference to the MPEG moving picture reproducing module of FIG. 3.

MPEG moving picture data inputted from external MPEG moving picture generating device 7 via an input device in the input/output device 5 is decoded/uncompressed by the MPEG moving picture reproducing device 2, which is mounted in arithmetic device 1 and buffered in buffer 4, within memory device 3.

The moving picture data (picture data and audio data), obtained as a result of the decoding process, is then output to external output device 6 (display and speaker or the like) via an output device of the input/output device 5. The MPEG moving picture reproducing device 2 executes such a moving picture reproducing process by continuously executing a series of these decoding and outputting processes.

Figure 4:
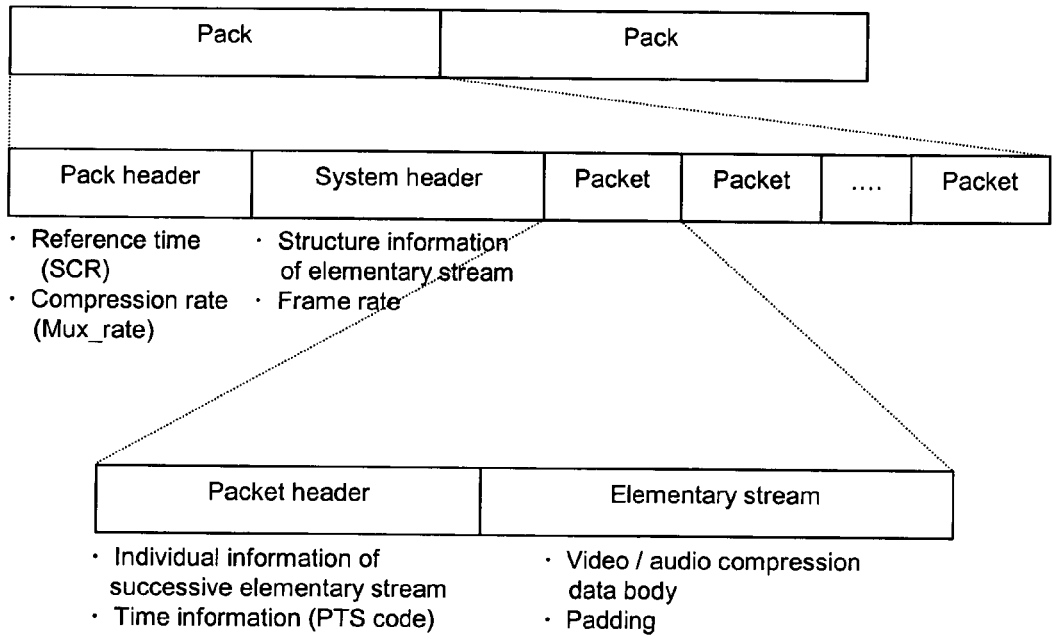
FIG. 4 is a diagram describing a structure of the MPEG moving picture data.

As illustrated in FIG. 4, the MPEG moving picture data is multiplexed using packets.

In each packet, an individual data stream (hereinafter referred to as an elementary data stream, ES) includes audio compression data (audio frame) and picture compression data (video frame), or the like. Hereinafter, an elementary data stream of picture data is referred to as a video elementary data stream, while an elementary data stream of audio data is referred to as an audio elementary data stream. The video elementary data stream includes a plurality of video frames, while the audio elementary data stream includes a plurality of audio frames.

In the header area (packet header) of each packet, individual information in regard to the elementary data stream is included within the packet with time information (PTS code) for synchronous output control or the like. The PTS code indicates, as the ISO control code, output timing of a corresponding frame. This time information is used to execute synchronous control during an actual picture output for the picture data and audio data obtained by decoding each elementary data stream.

A pack is defined as an aggregate of an optional number of packets. A pack header and a system header are provided in the header area of each pack. The pack header includes reference time information (SCR) of the data stream and data compression rate information. The system header includes format information of the elementary data stream, included within the pack, and frame rate information for video frames and audio frames, or the like.

In the ISO standard, no restriction for the packet format in the pack is specified. One data stream of the MPEG moving picture data is formed of a plurality of packs.

One frame is handled as one unit in each elementary data stream. In addition, one video frame corresponds data of a single display picture, which is actually outputted on a display screen. The time expressed with one video frame depends on the frame rate for the video frame.

A picture type of video frames on a video elementary data stream is different in every frame. This picture type is composed of three types of picture type, i.e., I (key frame without difference), P (single-way difference data) and B (both-way difference data). The P picture frame and B picture frame require the frame to be referred, for the decoding. Therefore, the normal decoding process cannot be executed in the single frame. Only the I picture frame can be decoded independently, in one frame, without reference to another frame.

Figure 5:
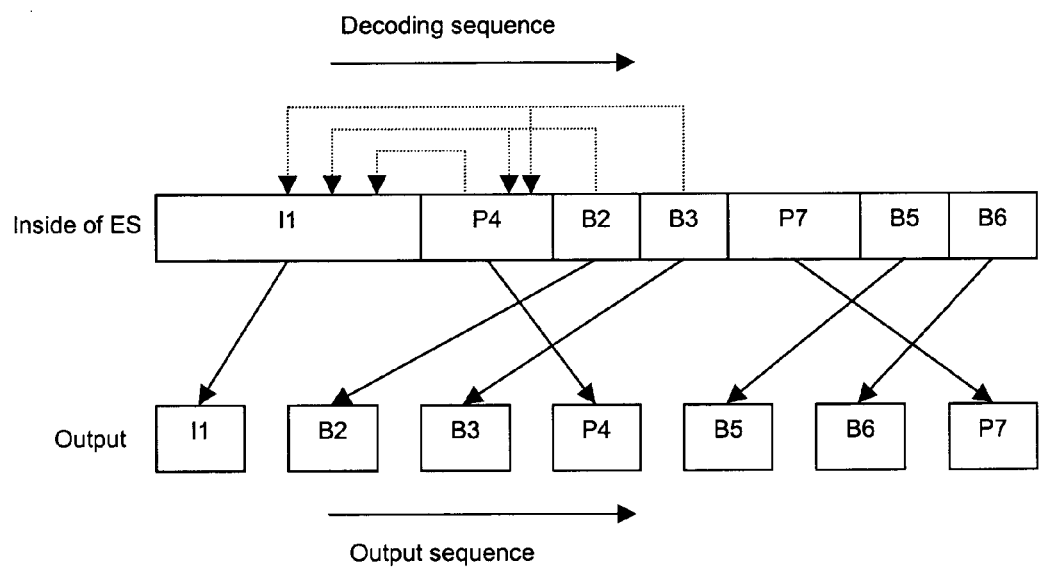
FIG. 5 is a diagram illustrating an arrangement of video frames in a video elementary data stream.

In a reproducing process of the MPEG moving picture data, as illustrated in FIG. 5, the actual output sequence of the video frames is different from the sequence in which the video frames are arranged in the video elementary data stream. The reason for this is that the B picture frame exists as a two-way difference frame, requiring references to frames before and after the B picture frame. In FIG. 5, the dotted line indicates the mutual relationship of the frames to be referenced. (There is no restriction on this arrangement of the video frames in the ISO standard.)

As will be explained in greater detail below, MPEG moving picture reproducing devices, according to embodiments of the present invention, retrieve and decode I picture frames in the data stream, without consideration to actual arrangement of video frames, when performing a reproducing process from an intermediate position of the data stream, thereby avoiding the extensive buffering processes required in conventional devices.

In the case of an ordinary reproducing process, in which MPEG moving picture data is sequentially decoded from a heading position of the data stream, it is not always necessary to refer to the PTS code at the time of determining an output timing of the picture data and audio data obtained by the decoding process. The reason for this is that it is sufficient to sequentially output each picture data and each audio data obtained by the decoding process from each heading data in a constant interval determined by the frame rate, using the frame rate of the video frame and audio frame indicated in the heading pack of the MPEG picture data at the heading position of the data stream.

Meanwhile, in a special reproducing process where the reproduction process is started from an optional intermediate seek position of the data stream, for normal reproducing process of the MPEG moving picture data, retrieval of an I picture frame, appearing first toward a positive direction of the time axis from the intermediate seek position, is required.

Since a result of a decoding process of P picture and B picture frames does not exist based solely on those picture frames, the normal decoding process cannot be executed, and therefore, the I picture frame which can be decoded normally in the single frame must be decoded first.

In addition, for the normal reproducing process, it is necessary to synchronously output the picture data and corresponding audio data obtained by the decoding process for the I picture frame appearing first.

Figure 6:
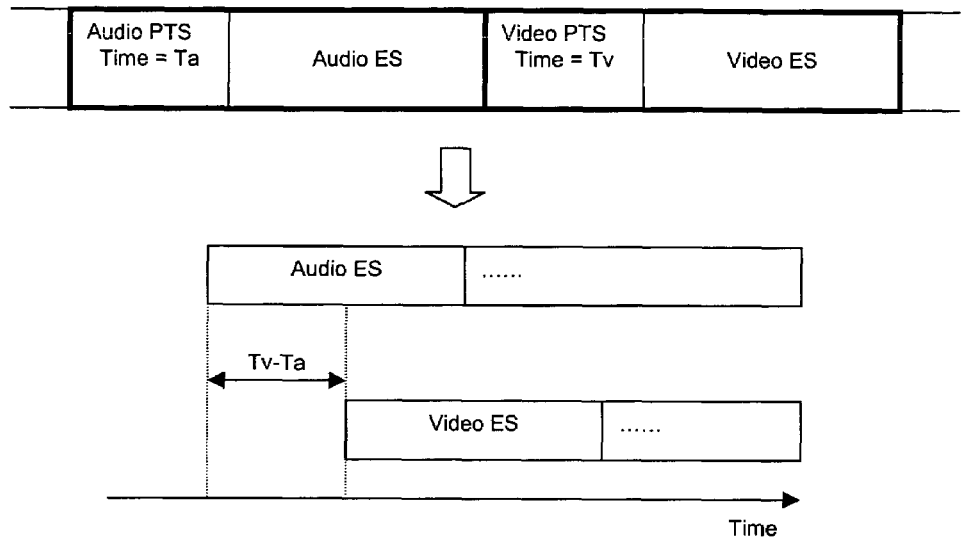
FIG. 6 is a diagram describing a control method when picture data and audio data are synchronously outputted based on the PST code, according to an embodiment of the present invention.
Figure 6:
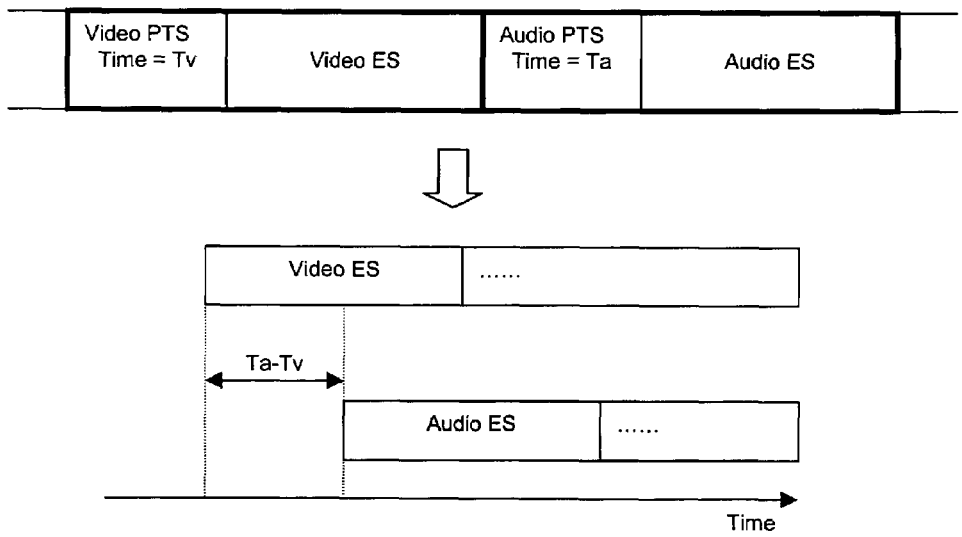

FIG. 6 is a diagram explaining a control method to synchronously output, based on the PST code given to each frame, the picture data and corresponding audio data obtained by the decoding process in a special reproducing process where reproduction is started from an optional intermediate seek position of the data stream.

In general, the PTS code is given to each of the frames of the picture data and audio data. However the PTS codes given to each of the adjacent packets of the picture data and audio data are not always matched. Therefore, in embodiments of the present invention, as illustrated in FIG. 6, picture data and audio data are synchronously outputted by obtaining a relationship in time of the picture data and audio data in the optional intermediate seek position, based on the PTS codes existing in each of the packet headers.

The PTS code of the picture data indicates the output time of the heading video frame included in the subsequent video elementary data stream. The output time Tv of the heading video frame can be obtained from the frequency of the reference clock used for generation of the PTS code of picture data in the moving picture generating device and the given PTS code.

The PTS code of the audio data indicates the output time of the heading audio frame included in the subsequent audio elementary data stream. The output time Ta of the heading audio frame can be obtained from the frequency of the reference clock used for generation of the PTS code of audio data in the moving picture generating device and the given PTS code.

In general, the frequencies of the reference clocks, which are referred for generation of the PTS codes of the picture data and audio data in the moving picture generating device, are different from each other.

The output timings of the picture data and audio data are determined as follows when the sampling rate of the audio data is defined as Sa.

When Ta<Tv  (1)

As illustrated in FIG. 6, the output timing of the heading video frame indicted by the output time Tv becomes the timing when the audio frames are outputted, as sampling output, as many times (Ca) as indicated below, from a timing where the heading audio frame in the adjacent packet of the audio data is outputted.

$Ca=Sa \times (Tv-Ta)$

When Ta>Tv  (2)

As further illustrated in FIG. 6, the heading audio frame in an adjacent packet of the audio data is outputted after the time which is required to output the audio frames, as sample output, as many times (Ca) as indicted below, from the timing where the heading video frame, indicated by the output time Tv, is outputted.

$Ca=Sa \times (Ta-Tv)$

As described above, in a special reproducing process of embodiments of the present invention, picture data and corresponding audio data obtained by a decoding process can be synchronously outputted, while the output timing is adjusted on the basis of the PST codes given to each frame.

In the above cases (1) and (2), a process not to output picture data or audio data, i.e., muting output, to be outputted previously, may be executed in the actual output process until the audio data or picture data of the following output time is outputted, after the picture data or audio data of the preceding output time is outputted. More clearly, during the above period, picture data and audio data may not be supplied to output device 6, of FIG. 3.

Here, as described above, in a special reproducing process, of embodiments of the present invention, where reproduction is started from an optional intermediate seek position of the data stream, it is essential for executing the process to synchronously output picture data and the corresponding desired audio data, obtained by the decoding process of the I picture frame appearing first toward the positive direction of time axis, that the time information (PTS code) is given, to the I picture frame appearing first.

However, since the PTS code is added to the optional video frame, not depending on the picture type in the ISO standard, the PTS code is not always given to the I picture frame (key frame), which assures normal decoding process based solely on the single frame.

Since the PTS code is not always given to the key frame, a moving picture reproducing device, according to an embodiment of the present invention, performs a process to interpolate a predetermined PTS code for a key frame appearing first toward the positive direction of time axis from the optional intermediate seek position of the data stream when the PTS code is not given to the key frame.

In more detail, a moving picture reproducing device of an embodiment of the present invention can count a number of frames from the video frame which is given the PTS code and appears first toward the positive direction of time axis from the optional intermediate seek position of the data stream up to the I or P picture frame appearing first toward the same direction after the I picture frame which is not given the PTS code and appears first toward the same direction. Thereby, the moving picture reproducing device, according to an embodiment of the present invention, interpolates the PTS code for the key frame (I picture frame) which is not given the PTS code and appears first on the basis of the PTS code value of the video frame given the PTS code and the counted number of frames.

Thus, if the PTS code is not interpolated as described above in this special reproducing process of the present invention, the reproducing process will be executed only when the key frame appearing first toward the positive direction of time axis from the optional intermediate seek position is given the PTS code, and the reproducing process will not be performed otherwise.

Methods of the present invention of interpolating the PTS code for the key frame will now be more further explained below. First, however, some expression formulae will be defined, for convenience of explanation.

Enumerators are defined as follows.

{A}=AAAAA . . . =an arrangement of an optional number of A's.

[A]=A=only one A.

Logical operators are defined as follows.

A|B=A or B

A function is defined as follows.

N(x)=a number of elements, of column x.

According to each definition formula, the following relationship formulae, for example, are thereby established.

p={A|B}=AABBB

N(p)=N(AABBB)=5

Moreover, in a special reproducing process, according to embodiments of the present invention, where reproduction is started from a designated intermediate seek position by designating a desired intermediate seek position on the data stream as the reproduction starting position, a PTS code of the video frame (hereinafter, referred to as the interpolation reference frame), which is given the PTS code and appears first toward the positive direction of time axis from the designated intermediate seek position, is defined as PTS0.

The picture type of the interpolation reference frame is defined as Pt. The PTS code of the key frame (hereinafter, referred to as interpolation target key frame) appearing first toward the positive direction of time axis from the designated intermediate seek position of the data stream is defined as PTSi.

Next, the interpolation method of the PTS code of the interpolation target key frame PTSi will be described in various cases where Pt is a I, P and B picture frame, respectively.

When Pt=I       (1)

When Pt=I, the interpolation reference frame is matched with the interpolation target key frame. The video frame which is given the PTS code and appears first toward the positive direction of time axis from the designated intermediate seek position on the data stream is the key frame (I picture frame). Therefore, the following relationship formula (hereinafter, referred to as the formula 1) is established.

PTSi=PTS0

Namely, the interpolation target key frame was previously already given the predetermined PTS code. When Pt=I, the interpolation process of the PTS code is unnecessary.

When Pt=B       (2)

When Pt=B, it is necessary to calculate PTSi from the PTS0. The picture type of the video frame in the video elementary data stream having the arrangement illustrated in FIG. 7 will now be described.

Figure 7:
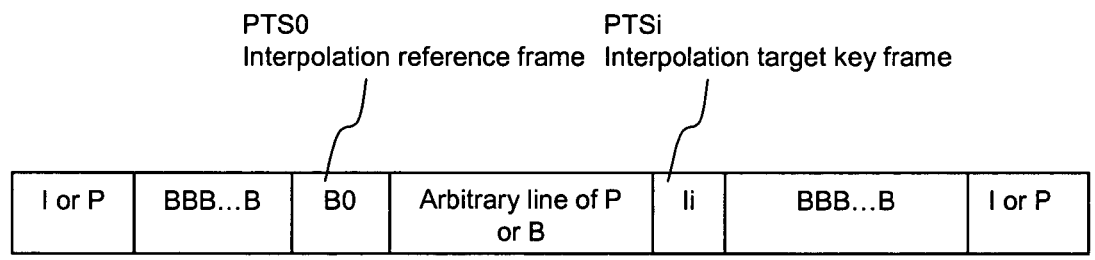
FIG. 7 is a diagram illustrating an arrangement of a picture type when an interpolation reference frame is a B picture frame, according to an embodiment of the present invention.

In FIG. 7, the picture type of the interpolation reference frame is indicated as B0. The picture type of the interpolation target key frame is indicated as Ii. The arrangement of the picture type illustrated in FIG. 7 can be normalized as follows using each expression formula defined above (hereinafter, referred to as formula 2).

. . . [I|P], {B}, B0, {P|B}, Ii, {B}, [I|P], {P|B} . . .

Figure 8:
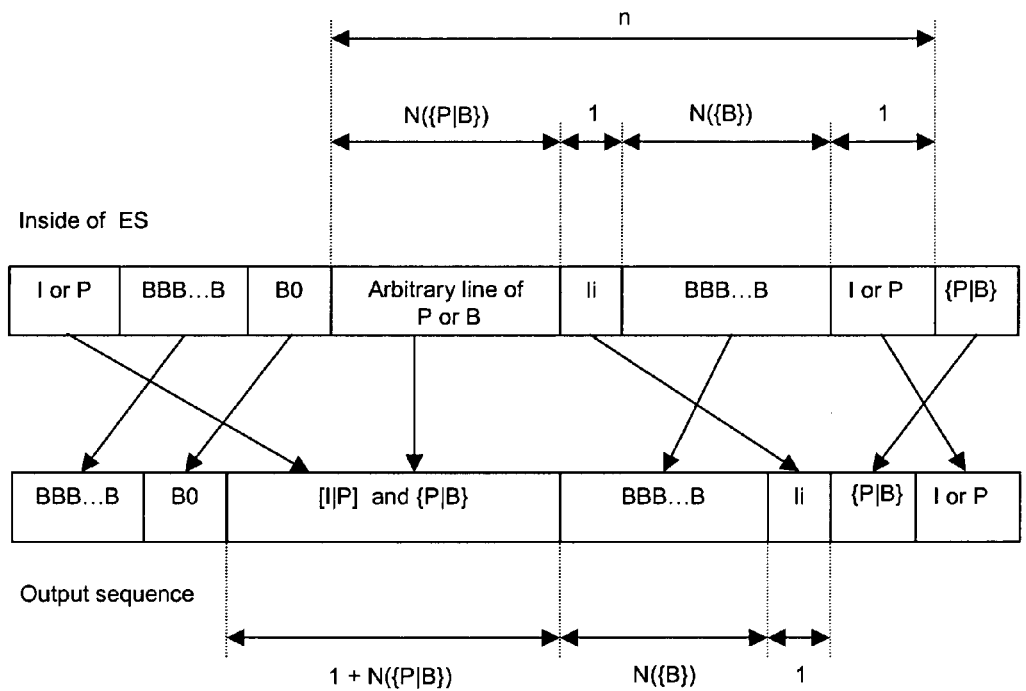
FIG. 8 is a diagram illustrating an arrangement of a picture type and actual output sequence of a video frame when an interpolation reference frame is a B picture frame, according to an embodiment of the present invention.

The arrangement sequence of the picture type in the video elementary data stream illustrated in FIG. 7 changes to that illustrated in FIG. 8 by re-arranging the data stream elements according to the output sequence arrangement, as the video frames are actually outputted. This arrangement can be indicated as follows in the normalized expression (hereinafter, referred to as the formula 3).

. . . {B}, B0, [I|P], {P|B}, {B}, Ii, {P|B}, [I|P] . . .

As is apparent from FIG. 8 and formula 3, in regard to a time difference Δt of output between the interpolation target key frame Ii and the interpolation reference frame B0, the following relationship can be established, using the expression formula defined above (hereinafter, referred to as formula 4).

$$\Delta t = (N(\{P|B\}) + 1 + N(\{B\}) + 1) \times T$$
$$= (N(\{P|B\}) + N(\{B\}) + 2) \times T$$

Here, T is an interval time between frames, which is an inverse number of the frame rate, for example, 1/30 sec.

Moreover, time difference Δt of output between the interpolation target key frame Ii and interpolation reference frame B0 corresponds to a difference of each PTS code. Therefore, the following relationship can be established (hereinafter, referred to as formula 5).

Δt=PTSi−PTS0

From the formulae 4 and 5, the PTS code (PTSi) of the interpolation target key frame Ii can be expressed as follows using the PTS code (PTS0) of the interpolation reference frame B0 (hereinafter, referred to as formula 6).

PTSi=PTS0+(N({P|B})+N({B})+2)×T

Meanwhile, in the arrangement of the video elementary data stream, when the number of frames up to the I or P picture frame appearing first after the interpolation target key frame Ii, toward the positive direction of time axis from the interpolation reference frame B0, is defined as n, the following relationship may be established (hereinafter, referred to as formula 7), as is apparent from FIG. 8.

$$N = N(\{P|B\}) + 1 + N(\{B\}) + 1$$
$$= N(\{P|B\}) + N(\{B\}) + 2$$

The following relationship may also be established by substituting formula 7 for formula 6 (hereinafter, referred to as formula 8).

$$PTSi = PTS0 + n \times T$$

Namely, when Pt=B, the PTS code of the interpolation target key frame can be interpolated with the formula 8, based on the PTS code (PTS0) of the interpolation reference frame and the counted number (n) of output frames, by counting the number of output frames up to the I or P picture frame appearing first after the interpolation target key frame toward the positive direction of time axis from the interpolation reference frame.

When Pt=P (3)

When Pt=P, similarly, it is necessary to calculate PTSi from the PTS0. The picture type of the video frame in the video elementary data stream, having the arrangements illustrated in FIG. 9 and FIG. 10 will now be described below. In these figures, the picture type of the interpolation reference frame is indicated as P0, while the picture type of the interpolation target key frame is indicated as Ii.

(3-1)

Figure 9:
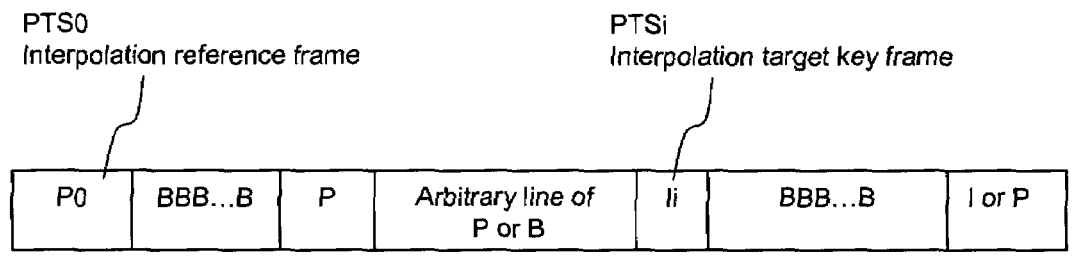
FIG. 9 is a diagram illustrating a first arrangement of a picture type when an interpolation reference frame is a P picture frame, according to an embodiment of the present invention.

The arrangement when at least one P picture frame exists between the interpolation reference frame P0 and interpolation target key frame Ii, as illustrated in FIG. 9, will first be considered.

The arrangement of the picture type illustrated in FIG. 9 can be normalized as described below using each expression formula defined above (hereinafter, referred to as formula 9).

... P0, {B}', P, {P|B}, Ii, {B}, [I|P], {P|B} ...

Figure 11:
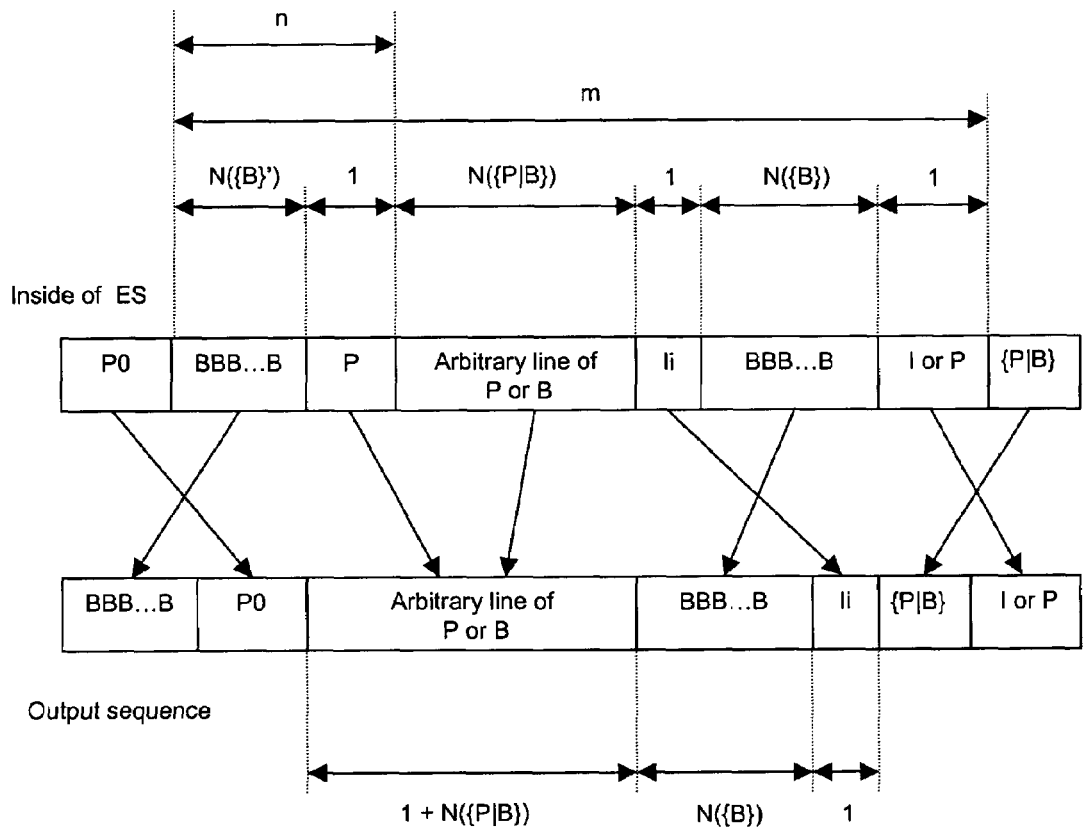
FIG. 11 is a diagram illustrating a first arrangement sequence of a picture type and an actual output sequence of a video frame when an interpolation reference frame is a P picture frame, according to an embodiment of the present invention.

The arrangement sequence of the picture type in the video elementary data stream illustrated in FIG. 9 is changed to that illustrated in FIG. 11 by re-arranging it to correspond to the output sequence, as the video frames are actually outputted. This arrangement may be expressed as follows in the normalized expression (hereinafter, referred to as formula 10).

... {B}', P0, P, {P|B}, {B}, Ii, {P|B}, [I|B] ...

As is apparent from FIG. 11 and formula 10, a time difference Δt of output between the interpolation target key frame Ii and interpolation reference frame P0 can be expressed by the following relationship, using the expression formula defined above, (hereinafter, referred to as formula 11).

$$\Delta t = (1 + N(\{P|B\}) + N(\{B\}) + 1) \times T$$
$$= (N(\{P|B\}) + N(\{B\}) + 2) \times T$$

Moreover, time difference Δt of output between the interpolation target key frame Ii and interpolation reference frame P0 also satisfies the aforementioned formula 5. Therefore the PTS code (PTSi) of the interpolation target key frame Ii may be expressed as follows from formula 5 and formula 11, using the PTS code (PTS0) of the interpolation reference frame P0 (hereinafter, referred to as formula 12).

$$PTSi = PTS0 + (N(\{P|B\}) + N(\{B\}) + 2) \times T$$

On the other hand, in an arrangement of video elementary data stream, when the number of frames from the interpolation reference frame P0 up to the I or P picture frame appearing first after the interpolation target key frame Ii toward the positive direction of time axis is defined as m, the following relationship may be established (hereinafter, referred to as formula 13), as is apparent from FIG. 11.

$$m = N(\{B\}') + 1 + N(\{P|B\}) + 1 + N(\{B\}) + 1$$
$$= N(\{B\}') + N(\{P|B\}) + N(\{B\}) + 3$$

In an arrangement of video elementary data stream, when the number of frames from the interpolation reference frame P0 up to the P picture frame appearing first toward the positive direction of time axis is defined as n, the following relationship may be established (hereinafter, referred to as formula 14), as is apparent from FIG. 11.

$$n = N(\{B\}') + 1$$

From the formulae 13 and 14, the following relationship may be established (hereinafter, referred to as formula 15).

$$m - n = N(\{P|B\}) + N(\{B\}) + 2$$

The following relationship may be established by substituting formula 12 for formula 15 (hereinafter, referred to as formula 16).

$$PTSi = PTS0 + (m - n) \times T \quad (3-2)$$

Figure 10:
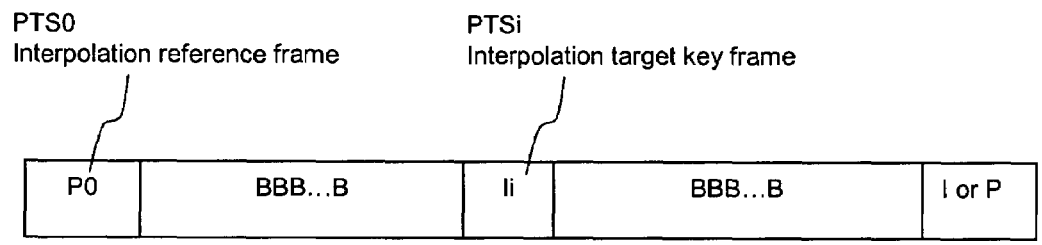
FIG. 10 is a diagram illustrating a second arrangement of a picture type when an interpolation reference frame is a P picture frame, according to an embodiment of the present invention.

The case of the data stream arrangement where no P picture frame exists between the interpolation reference frame P0 and interpolation target key frame Ii and existing frames are all B picture frames, as illustrated in FIG. 10, will be considered.

The arrangement of the picture type illustrated in FIG. 10 can be normalized as follows using each expression formula defined above (hereinafter, referred to as formula 17).

... P0, {B}', Ii, {B}, [I|P], {P|B} ...

Figure 12:
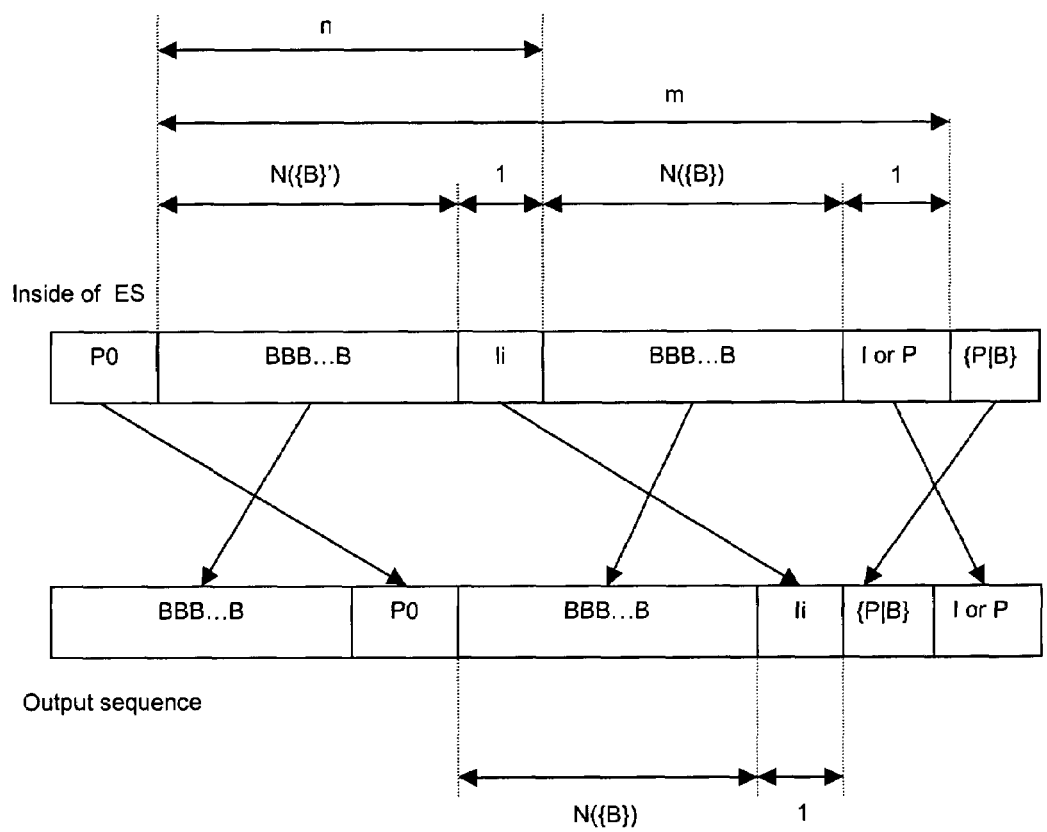
FIG. 12 is a diagram illustrating a second arrangement sequence of a picture type and an actual output sequence of a video frame when an interpolation reference frame is a P picture frame, according to an embodiment of the present invention.

The arrangement sequence of the picture type in the video elementary data stream illustrated in FIG. 10 changes to that illustrated in FIG. 12 by re-arranging it to correspond to the output sequence, as the video frames are actually outputted. This arrangement may be normalized as expressed below (hereinafter, referred to as formula 18).

... {B}', P0, {B}, Ii, {P|B}, [I|P] ...

As is apparent from FIG. 12 and FIG. 18, time difference Δt of output between the interpolation target key frame Ii and interpolation reference frame P0 can be expressed with the following relationship, using the expression formula defined above (hereinafter, referred to as formula 19).

$$\Delta t = (N(\{B\}) + 1) \times T$$

Moreover, time difference Δt of output between the interpolation target key frame Ii and interpolation reference frame P0 also satisfies the aforementioned formula 5. Therefore, the PTS code (PTSi) of the interpolation target key frame Ii may be expressed, as follows from the formulae 5 and 19, using the PTS code (PTS0) of the interpolation reference frame (hereinafter, referred to as formula 20).

$$PTSi = PTS0 + (N(\{B\}) + 1) \times T$$

Meanwhile, in the arrangement of video elementary data stream, when the number of frames from the interpolation reference frame P0 up to the I or P picture frame appearing first after the interpolation target key frame Ii toward the positive direction of time axis is defined as m, the following relationship may be established (hereinafter, referred to as formula 21), as is apparent from FIG. 11.

$$m = N(\{B\}') + 1 + N(\{B\}) + 1$$
$$= N(\{B\}') + N(\{B\}) + 2$$

In the arrangement of video elementary data stream, when the number of frames from the interpolation reference frame P0 up to the I picture frame appearing first toward the positive direction of time axis is defined as n, the following relationship may be established (hereinafter, referred to as formula 22), as is apparent from FIG. 11.

$$n = N(\{B\}') + 1$$

From the formulae 21 and 22, the following relationship may be established (hereinafter, referred to as formula 23).

$$m - n = N(\{B\}) + 1$$

The following relationship may also be established by substituting the formula 23 for formula 20 (hereinafter, referred to as formula 24).

$$PTSi = PTS0 + (m-n) \times T$$

Formula 24 is identical to formula 16.

Figure 13:
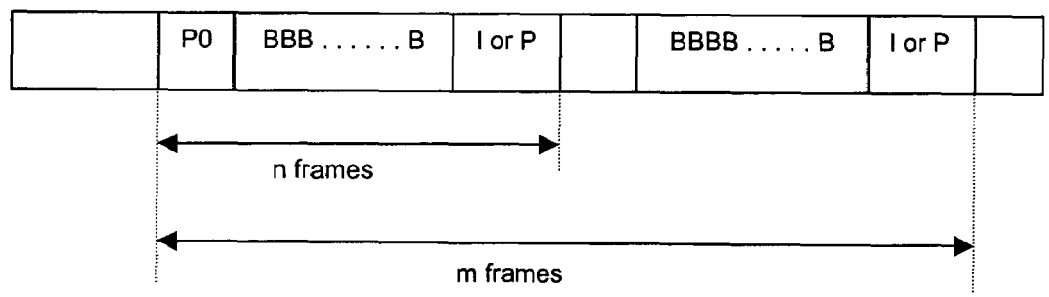
FIG. 13 is a diagram for describing a general interpolation method of a PTS code when an interpolation reference frame is a B picture frame, according to an embodiment of the present invention.

Thus, the results of calculations of the above sections (3-1) and (3-2), described above, can be summarized as follows. As illustrated in FIG. 13, when Pt=P, the PTS code (PTSi) of the interpolation target key frame can be interpolated with the formula 16 (formula 24), based on the PTS code (PTS0) of the interpolation reference frame and counted numbers (n, m) of output frames, by counting the number (n) of output frames from the interpolation reference frame up to the I or P picture frame appearing first toward the positive direction of time axis and the number (m) of output frames from the interpolation reference frame up to the I or P picture frame appearing first after the interpolation target key frame.

As described above, even when an optional intermediate seek position is designated as the reproduction starting position, the MPEG moving picture reproducing device of the present invention can easily execute the special reproducing process, according to embodiments of the present invention, to start reproduction from the designated intermediate seek position because the MPEG moving picture reproducing device interpolates the PTS code to the key frame having no PTS code based on the relationship between the number of frames and PTS code.

Moreover, the special reproducing process of embodiments of the present invention, based on the PTS code interpolation processes of sections (1) to (3) described above, is not required to execute the decoding process for each video frame after the designated intermediate seek position, and is required only to retrieve the picture type and to count the number of frames.

Accordingly, the extent of arithmetic processes required within a constant period can be reduced and, as well as reducing the quantity of data required to be buffered, compared with conventional MPEG moving picture reproducing devices.

Thus, the special reproducing process of embodiments of the present invention may be executed with an arithmetic device having a low speed operation cycle and only does not require a memory device with a large memory capacity. As a result, the special reproducing process of embodiments of the present invention can sufficiently be executed in a compactly configured reproducing module.

Figure 14:
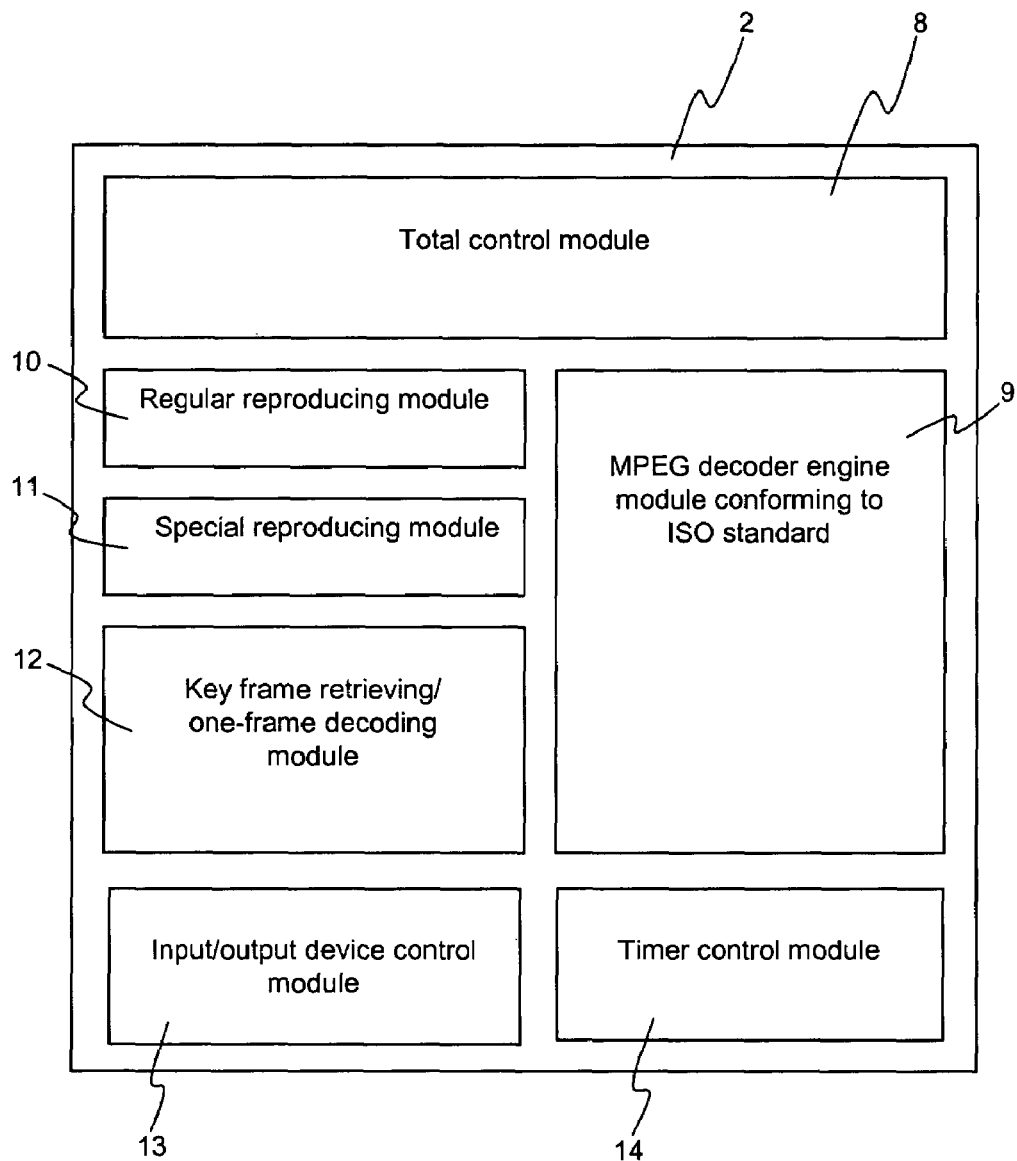
FIG. 14 is a diagram illustrating a moving picture reproducing module to execute a special reproduction process, according to an embodiment of the present invention.

FIG. 14 illustrates an example of a configuration of an MPEG moving picture reproducing module, according to an embodiment of the present invention. The MPEG moving picture reproducing module of FIG. 14 includes a total control module 8, a MPEG decoder engine module 9, a regular reproducing module 10, a special reproducing module 11, a key frame retrieving/one-frame decoding module 12, an input/output device control module 13, and a timer control module 14.

The MPEG moving picture reproducing device 2, illustrated in FIG. 3, may include a plurality of these modules, as illustrated in FIG. 14.

Total control module 8 controls the operation of the MPEG moving picture reproducing device 2 to control operations of MPEG decoder engine module 9, regular reproducing module 10, special reproducing module 11, key frame retrieving/one-frame decoding module 12, input/output device control module 13, timer control module 14, in the MPEG moving picture reproducing device 2. Total control module 8 can perform management of memory device 3, illustrated in FIG. 3.

Regular reproducing module 10 calls MPEG decoder engine module 9 and thereby performs a regular reproducing process for decoding the input MPEG moving picture data, in cooperation with the MPEG decoder engine module 9.

Figure 2:
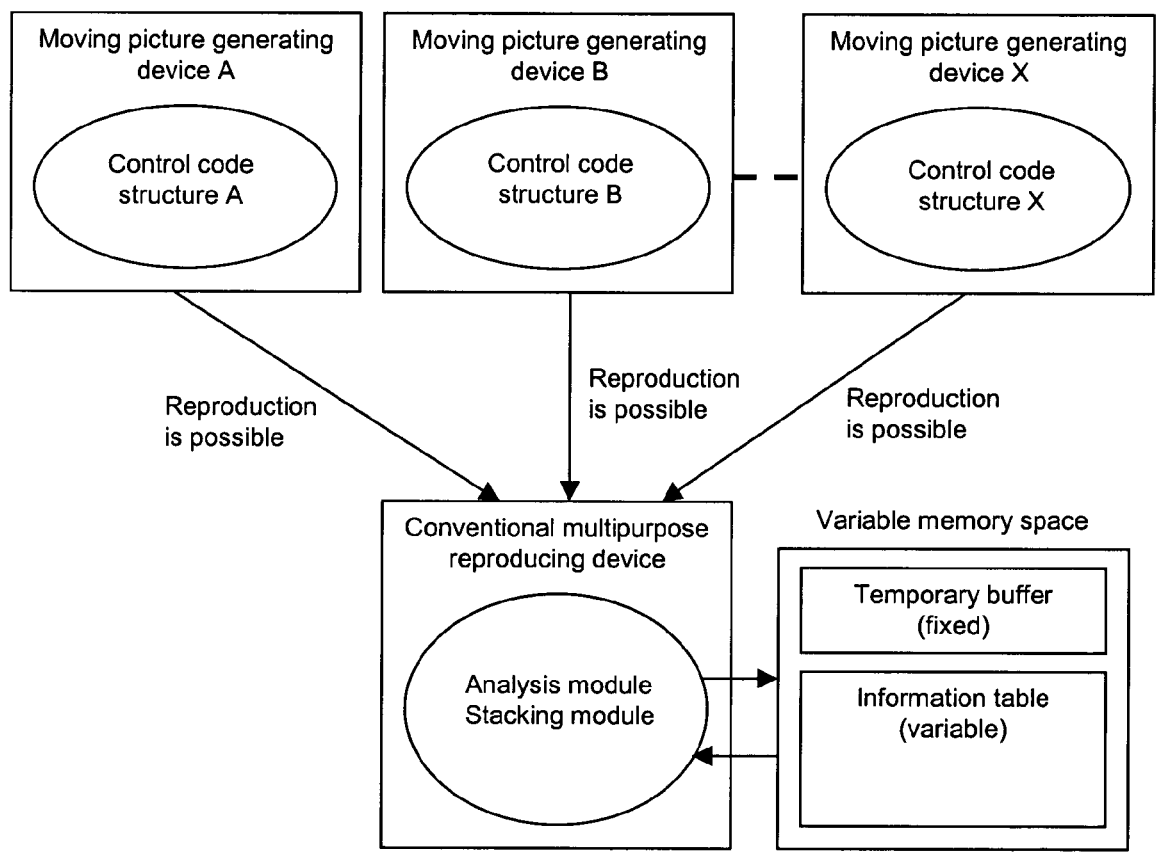
FIG. 2 is a diagram of a conventional multipurpose MPEG moving picture reproducing device operation.

A regular reproducing process of the present invention also includes sequentially decoding each video frame and audio frame from the heading area of the MPEG moving picture data stream to reproduce the data stream in which the ISO control code has the aforementioned optional structure, as in the conventional multipurpose MPEG moving picture reproducing device discussed regarding FIG. 2.

Regular reproducing module 10 outputs picture data and audio data obtained as a result of the decoding process while executing synchronous output control, based on the time information (PTS code) given to the frames thereof.

When a reproducing process is initiated for an optional intermediate seek position of the data stream, special reproducing module 11 calls key frame retrieving/one-frame decoding module 12 and MPEG decoder engine module 9. Special reproducing module 11 thereby executes a special reproducing process, according to embodiments of the present invention. This special reproducing process may include reproducing operations such as frame fast-forward and rewind processes.

Special reproducing module 11 can accordingly retrieve a key frame which is not given a PTS code and appears first by executing the retrieval toward the positive direction of time axis from the intermediate seek position of data stream. Thereby special reproducing module 11 can perform the decoding process of one frame for the retrieved key frame and also can also execute an interpolation process of the PTS code, as detailed above.

Key frame retrieving/one-frame decoding module 12 can analyze the data stream of the MPEG moving picture data and retrieve the picture type of the video frame included in the video elementary data stream toward the positive direction of time axis from the optional intermediate seek position.

Key frame retrieving/one-frame decoding module 12 can also retrieve the key frame appearing first, which can be decoded normally without reference to other frames. Key frame retrieving/one-frame decoding module 12 thereby performs a skip process, without execution of decoding processes of skipped frames, up to the video frame of the picture type required for the PTS interpolation process described above and thereby counts up the number of frames skipped from the intermediate seek position.

Key frame retrieving/one-frame decoding module 12 also performs the decoding process for the retrieved key frame by calling the MPEG decoder engine module 9.

Namely, key frame retrieving/one-frame decoding module 12 of the present invention may only retrieve the picture type of the video frame and not perform the decoding process for each of the video frames. The key frame retrieving/one-frame decoding module 12 is given the simple counter function for the number of frames.

Accordingly, the MPEG moving picture reproducing device of embodiments of the present invention does not have to perform unnecessary decoding processes and buffering required by conventional reproducing devices. Therefore, the MPEG moving picture reproducing device of embodiments of the present invention may only need a low speed arithmetic device and a low capacity memory device, which permits the MPEG moving picture reproducing device to have a compact resource configuration.

MPEG decoder engine module 9 is an engine module for the MPEG decoder which conforms to the ISO standard. MPEG decoder engine module 9 analyzes the data stream of MPEG moving picture data and thereby obtains various control information pieces (ISO control code) such as the PTS code. MPEG decoder engine module 9 performs the decoding process of the MPEG moving picture data based on the obtained control information. MPEG decoder engine module 9 is also capable of decoding the data stream in which the ISO control code has an optional structure.

Moreover, MPEG decoder engine module 9 outputs video data and audio data obtained as a result of the decoding process to output device 6, such as a display and speaker illustrated in FIG. 3, after converting the data to the predetermined data format.

Input/output device control module 13 can be a device driver for the input device and output device and perform control of input/output device 5, illustrated in FIG. 3.

Timer control module 14 performs time management of the MPEG moving picture reproducing device 2 and can operate based on the Real Time OS or the timer mechanism provided by the arithmetic device.

Figure 15:
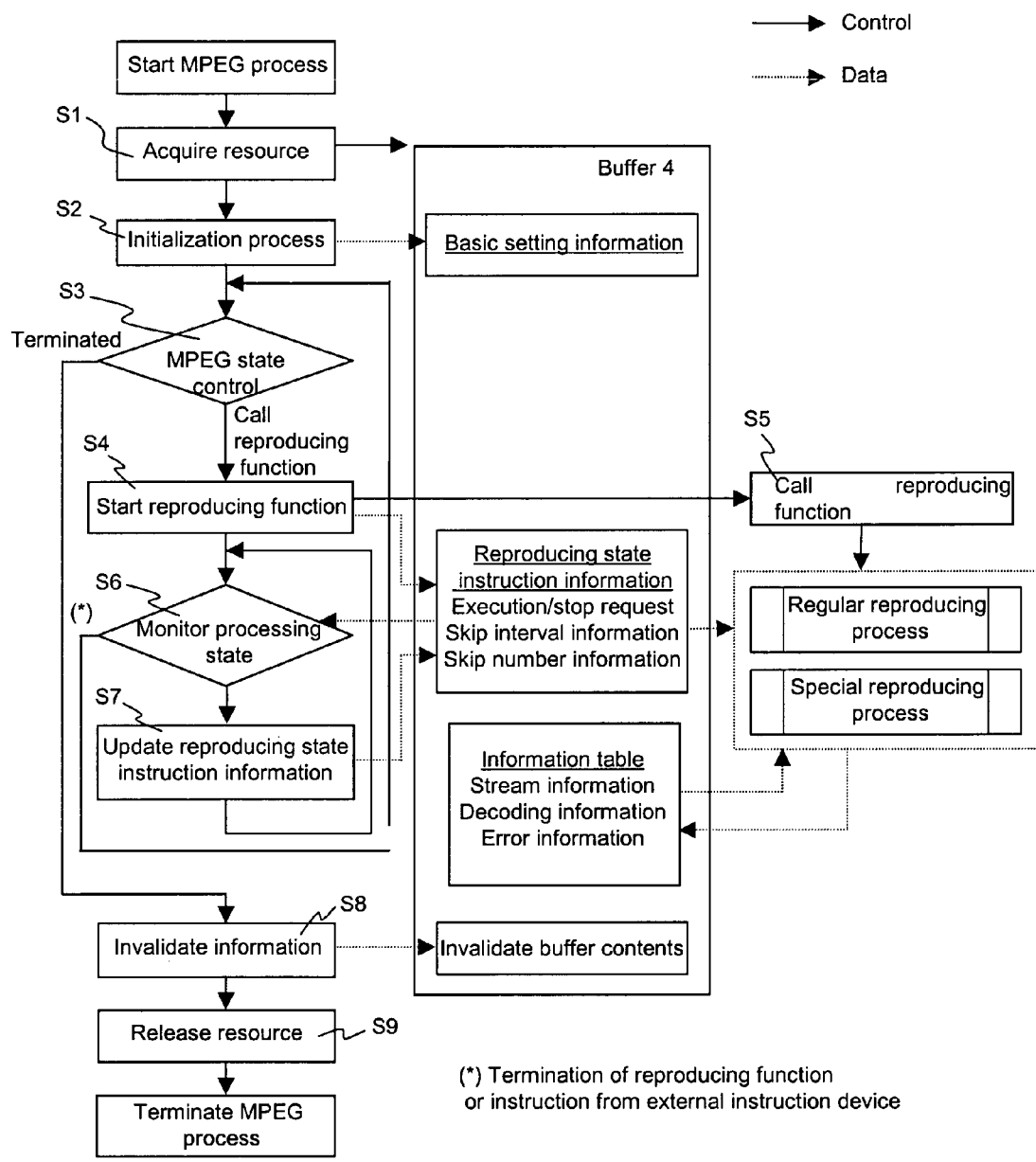
FIG. 15 is a diagram illustrating a total control flow of a MPEG moving picture reproducing device, according to an embodiment of the present invention.

FIG. 15 illustrates a total control flow of the MPEG moving picture reproducing device, according to an embodiment of the present invention.

When reproducing processes of the MPEG moving picture data are started, in the operation S1, total control module 8 acquires the resource (data storing area and work area or the like) within buffer 4 in the memory device. In operation S2, total control module 8 initializes basic setting information (information indicating storing destination addresses of input/output data within the buffer and information indicating validation/invalidation of stored data) in buffer 4.

In operation S3, total control module 8 monitors the total state of the MPEG moving picture reproducing process. In operation S3, when requested to call a reproducing process function, such as the regular reproducing process or the special reproducing process, the process flow proceeds to operation S4, and when requested to complete the reproducing process, the process flow proceeds to operation S8.

In operation S4, the process proceeds to operation S5 to call a desired reproducing process function and also proceeds to operation S6 to monitor the state of the reproducing process. Moreover, total control module 8 can set the reproducing state instruction information in buffer 4 in operation S4.

The reproducing state instruction information includes information to instruct the reproducing process execution/stop request and information to instruct the interval and number of frames to skip for the intermediate seek position in which the reproducing process is started, in the special reproducing process. The reproducing state instruction information includes instruction information which is referred for each reproducing process.

In operation S5, total control module 8 calls a predetermined reproducing process function depending on a designated reproducing process. Total control module 8 calls regular reproducing module 10 (regular reproducing process function) to perform the regular reproducing process. Total control module 8 also calls special reproducing module 11 (special reproducing process function) to perform the special reproducing process, according to embodiments of the present invention.

Regular reproducing module 10 performs regular reproducing processes while it is referring to reproducing state instruction information in buffer 4 by calling MPEG decoder engine module 9, conforming to the ISO standard. Special reproducing module 10 performs special reproducing process, according to embodiments of the present invention, while it is referring to reproducing condition instruction information in buffer 4, by calling key frame retrieving/one-frame decoding module 12 and MPEG decoder engine module 9.

MPEG decoder engine module 9 stores information which has been obtained through an analysis of the data stream and the decoding process, during the reproducing process, within buffer 4, as the information table comprising data stream information, decoding information and error information or the like.

In operation S6, total control module 8 monitors the state of the reproducing process while referring to various information pieces of the information table in buffer 4 and an instruction from an external instruction device such as a remote controller. When the called predetermined reproducing process function is completed or when a particular instruction is issued from the external instruction device, the process returns to operation S3. In other cases, the process goes to operation S7.

In operation S7, total control module 8 updates reproducing state instruction information in buffer 4 based on a result of state monitoring in operation S7. After the end of the update process, the process returns operation S6.

In operation S8, total control module 8 invalidates information stored in buffer 4. For example, total control module 8 performs an invalidation process by storing control information, which indicates that data stored in buffer 4 is all invalidated, to a predetermined area of the buffer 4.

In operation S9, total control module 8 releases the resource within buffer 4, in memory device 3, to terminate a reproducing process of the MPEG moving picture data.

Figure 16:
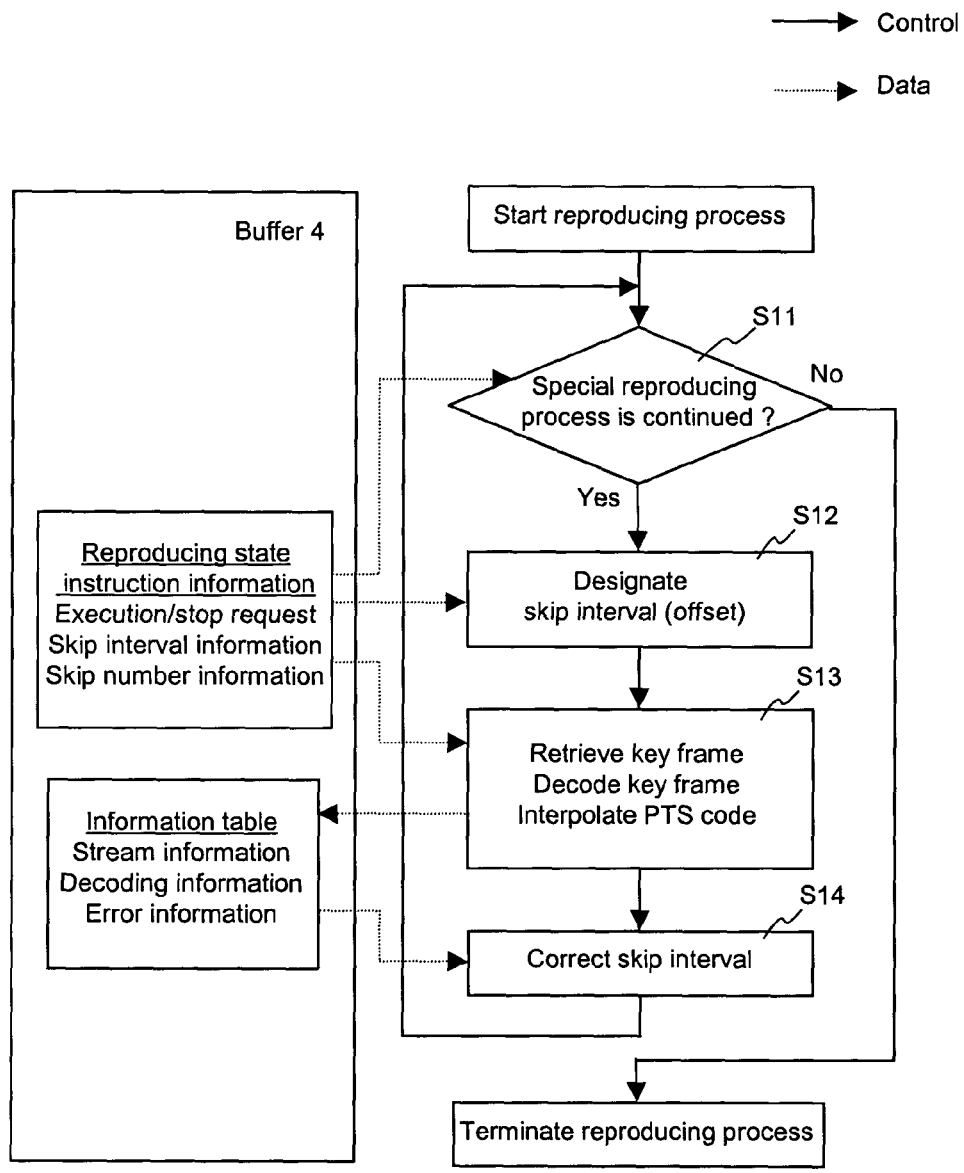
FIG. 16 is a diagram illustrating an example of a special reproduction process flow of a MPEG moving picture reproducing device, according to an embodiment of the present invention.

FIG. 16 illustrates an example of flow of a special reproducing process of the MPEG moving picture reproducing device, according to an embodiment of the present invention. When this special reproducing process function is called, in operation S5 of FIG. 15, the process flow illustrated in FIG. 16 is executed. In the process of FIG. 16, the special reproducing process (skip reproducing process) is preformed through a skip process to the next intermediate seek position from a position where the decoding process is being performed.

When the special reproducing process is started, in operation S11, special reproducing module 11 judges whether the special reproducing process is to be continued by referring to a skip number information included in reproducing state instruction information in buffer 4. When the present total skip number is less than a skip number designated by the skip number information and the special reproducing process is therefore continued, the process goes to operation S12. When the present total skip number is equal to the skip number designated with the skip number information, the special reproducing process is terminated.

In operation S12, the special reproducing module 11 refers to skip interval information included in the reproducing state instruction information in buffer 4 (the skip internal information based on the corrected skip interval when the correction process is performed in operation S14 described below), and thereby sets an interval up to the next intermediate seek position from the present decoding position (offset from the present seek position) based on the skip interval designated with the skip interval information. Special reproducing module 11 designates the position isolated by the skip interval from the present decoding position as the intermediate seek position in which the next reproducing process is started.

In operation S13, special reproducing module 11 performs a retrieval of the key frame and the decoding process and PTS code interpolation process of the retrieved key frame at the intermediate seek position determined in operation S12, while referring to the reproducing state instruction information in buffer 4.

Special reproducing module 11 analyzes the data stream by calling key frame retrieving/one-frame decoding module 12 and MPEG decoder ending module 9 and thereby retrieves the key frame (I picture frame) appearing first toward the position direction of time axis from the intermediate seek position determined in operation S12. Special reproducing module 11 performs the decoding process only of one frame for the retrieved key frame.

Simultaneously, special reproducing module 11 may analyze the data stream by calling key frame retrieving/one-frame decoding module 12 and MPEG decoder engine module 9 and thereby performs the interpolation process of PTS code for the retrieved key frame, according to embodiments of the present invention, as detailed.

As detailed above, in operation S13, the reproducing process is performed for the key frame appearing first toward the positive direction of time axis from the intermediate seek position designated in operation S12. Special reproducing module 11 stores information obtained by analysis of the data stream and decoding process in buffer 4 as the information table including the data stream information, decoding information and error information or the like.

In operation S14, as required, special reproducing module 11 performs correction process for the skip interval designated with the skip interval information while referring to the information table in buffer 4. The process returns to operation S11 setting the corrected skip interval as the new skip interval information.

Here, when the special reproducing process, according to embodiments of the present invention, is the process in which the reproducing process is started from an optional intermediate seek position in the data stream and the continuous video frame and audio frame are sequentially decoded after this intermediate seek position, it is enough when the present decoding position is set as the heading position of data stream, the skip interval is set as the interval up to the intermediate seek position from the heading area of data stream, and the skip number can be set to one (1).

Figure 17:
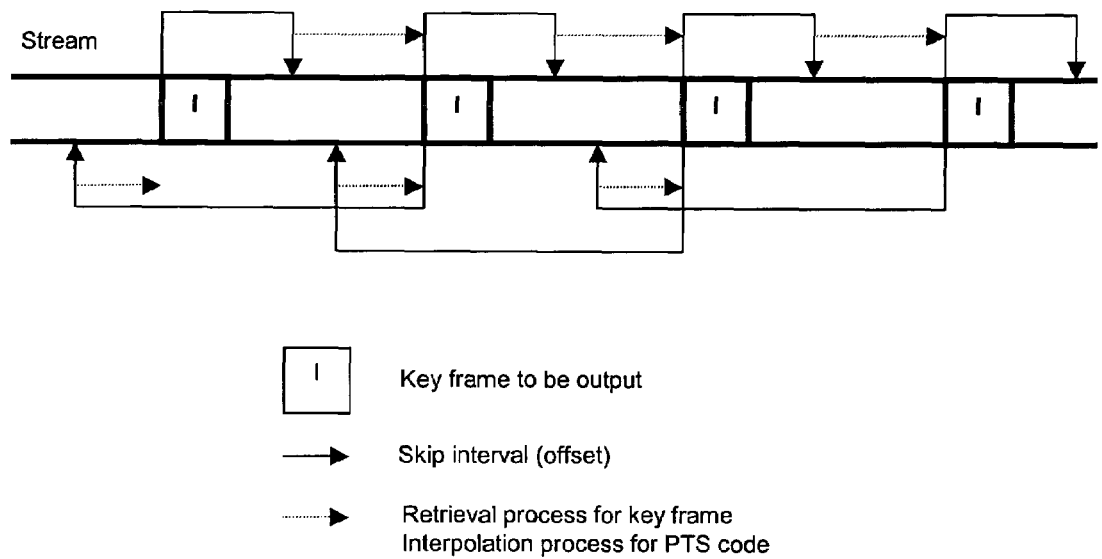
FIG. 17 is a diagram describing a frame fast-forward process and rewind reproduction process, according to an embodiment of the present invention.

Meanwhile, when the special reproducing process is such a process as a frame fast-forward and rewind process, as illustrated in FIG. 17, the present decoding position can be set as the position of frame which is considered as the present decoding target, and the skip interval and skip number can be set as a predetermined interval and number designated by total control module 8.

FIG. 17 illustrates the special reproducing process of the frame fast-forward and rewind process in the MPEG moving picture reproducing device, according to embodiments of the present invention.

In the frame fast-forward reproducing process of FIG. 17, the key frame retrieving/one-frame decoding module is called at a seek position isolated by the predetermined skip interval (positive offset) designated by total control module 8 toward the positive direction of time axis from the position of the present key frame (I picture frame). Thereby, the key frame can be retrieved toward the position direction of time axis from the seek position and the interpolation process of PTS code can be performed for the retrieved key frame.

In the rewind reproducing process of FIG. 17, the key frame retrieving/one-frame decoding module is called at a seek position isolated by the skip interval (negative offset) designated by the total control module toward the negative direction of time axis from the position of the present frame (I picture frame). Thereby the key frame can be retrieved toward the positive direction of time axis from the seek position and the interpolation process of PTS code can be performed to the retrieved key frame.

In the process described corresponding to operations S12 and S13, in FIG. 16, only the key frames in the data stream are sequentially selected and outputted toward the positive or negative direction of time axis by repeating these processes. Thereby the frame fast-forward reproducing process and rewind process are executed.

The key frame retrieving/one-frame decoding module is specified to return an error when the seek position exceeds the range of data stream (EOF or the like) or when the seek position has returned to the position before an offset is designated, as a result of retrieving toward the positive direction from the seek position obtained by designating the offset in the negative direction of time axis. Therefore it is actually necessary to operate this module while the skip interval is corrected based on the above result. This process corresponds to operation S14 in FIG. 18.

FIG. 18 comparatively illustrates respective functions and used environmental resources (arithmetic device, memory device) with reference to the MPEG moving picture reproducing device of embodiments the present invention (including software), existing MPEG moving picture reproducing device A (multipurpose MPEG moving picture reproducing device realized with a personal computer or the like) and existing MPEG moving picture reproducing device B (MPEG moving picture reproducing device for a particular data stream realized for a reproducing module).

As is apparent from FIG. 18, the MPEG moving picture reproducing device, according to embodiments of the present invention, can realize a special reproducing process for optional MPEG moving picture data within a compact environment, including at least a low speed cycle arithmetic device and low capacity memory device, by utilizing an interpolation process of PTS code described above and may also realize the multipurpose MPEG moving picture reproducing device corresponding to the optional data streams with the various structures of ISO control code.

The MPEG moving picture reproducing device of embodiments of the present invention can be realized with hardware and also with software, i.e., a computer program on a computer readable medium.

Further, embodiments of the present invention may be embodied in a general purpose digital computer, or computers, by running a program from a computer readable medium, including but not limited to storage media such as magnetic storage media (e.g., ROMs, floppy discs hard discs, etc.), optically readable media (e.g., CD-ROMs, DVDs, etc.) and carrier waves (e.g., transmissions over the Internet). The computer readable recording medium may also be dispersively installed in a computer system connected to a network, and stored and executed as a computer readable code by a distributed computing environment.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A moving picture reproducing device for reproducing an inputted data stream of moving picture data comprised of a plurality of frames, comprising:
    a time information interpolation processing unit to count a number of frames from a first frame up to a second frame, and to interpolate time information for a key frame based on time information of the first frame and the counted number of frames; and
    a decoding unit to decode and output the moving picture data based on the interpolated time information of the key frame,
    wherein the first frame appears toward a positive direction of a time axis from a predetermined intermediate seek position in the data stream, and
    the second frame appears after the key frame, with the key frame not having time information and appearing toward the positive direction of the time axis from the intermediate seek position.

2. The moving picture reproducing device according to claim 1,
    wherein the key frame is a frame for which the normal decoding process is executed without reference to other frames.

3. The moving picture reproducing device according to claim 1,
    wherein the time information interpolation processing unit interpolates the time information of the key frame based on the time information of the first frame, the counted number of frames, and interval time between frames.

4. The moving picture reproducing device according to claim 1, further comprising:
    a regular reproduction processing unit; and
    a decoder engine unit,
    wherein said regular reproduction processing unit executes a regular reproduction process to sequentially decode frames from a header frame of the data stream by calling the decoder engine unit.

5. The moving picture reproducing device according to claim 4,
    wherein the regular reproducing process does not perform the interpolation of the time information.

6. The moving picture reproducing device according to claim 1, further comprising:
    a special reproduction processing unit;
    a key frame retrieving/one-frame decoding unit; and
    a decoder engine unit,
    wherein the special reproduction processing unit calls the key frame retrieving/one-frame decoding unit, the decoder engine unit and the time information interpolation processing unit and executes the decode process only of one frame for the key frame while executing the interpolation of the time information for the key frame.

7. The moving picture reproducing device according to claim 6,
    wherein the key frame retrieving/one-frame decoding unit analyzes the data stream and retrieves the key frame by retrieving only picture type information of a frame toward the positive direction of time axis from the intermediate seek position, and
    wherein the key frame retrieving/one-frame decoding unit skips up to a frame of picture type required for the interpolation of the time information without executing the decoding process and counts up a number of frames skipped from the intermediate seek position.

8. The moving picture reproducing device according to claim 7,
    wherein the key frame retrieving/one-frame decoding unit performs the decoding process only of one frame for the retrieved key frame by calling the decoder engine unit.

9. The moving picture reproducing device according to claim 1,
    wherein the moving picture data is MPEG moving picture data, the key frame is an I-picture frame and the time information is a PTS code.

10. The moving picture reproducing device according to claim 9,
    wherein, when the first frame is an I picture frame, the time information interpolation processing unit does not perform the interpolation of the time information for the key frame.

11. The moving picture reproducing device according to claim 9,
    wherein the first frame is a B picture frame and the second frame is an I picture frame or a P picture frame.

12. The moving picture reproducing device according to claim 9,
    wherein, when the first frame is a P picture frame, the second frame is an I picture frame or a P picture frame, and the time information interpolation processing unit counts up a first number of frames from the first frame up to the I picture frame or P picture frame, counts up a second number of frames from the first frame up to an I picture frame or P picture frame appearing after the first frame, and interpolates the time information to the key frame based on the time information of the first frame, the counted first number of frames, and the counted second number of frames.

13. The moving picture reproducing device according to claim 9,
    wherein, when the first frame is a P picture frame and at least one P picture frame exists between the first frame and the key frame, the second frame is an I picture frame or a P picture frame, and the time information interpolation processing unit counts up a first number of frames from the first frame up to the I picture frame or P picture frame, counts up a second number of frames from the first frame up to a P picture frame appearing next, and interpolates the time information for the key frame based on the time information of the first frame, the counted first number of frames, and the counted second number of frames.

14. The moving picture reproducing device according to claim 9,
wherein, when the first frame is a P picture frame and no P picture frame exists between the first frame and the key frame, the time information interpolation processing unit counts up a first number of frames from the first frame up to a I picture frame or P picture frame appearing after the key frame, counts up a second number of frames from the first frame up to the key frame, and interpolates the time information to the key frame based on the time information of the first frame, the counted first number of first frames, and the counted second number of frames.

15. The moving picture reproducing device according to claim 1, further comprising:
a skip reproduction processing unit to define a position isolated by a predetermined skip interval designated with skip interval information from a present decoding position as the intermediate seek position, retrieves the key frame, interpolates the time information of the retrieved key frame, and performs skip reproduction process to selectively output the key frame.

16. The moving picture reproduction device according to claim 15,
wherein the skip reproduction processing unit repeatedly performs the skip reproduction process while sequentially changing the intermediate seek position based on skip number information to designate a number of skip which indicates a number of times of repetition of the skip reproduction process.

17. The moving picture reproducing device according to claim 16,
wherein, when the skip reproduction process is a process in which the reproduction is started from a predetermined intermediate seek position in the data stream and continuous frames of moving picture data are sequentially decoded after the predetermined intermediate seek position, the present decoding position is a header position of the data stream, the skip interval is an interval from the header position of the data stream up to the predetermined intermediate seek position and the skip number is one.

18. The moving picture reproducing device according to claim 16,
wherein, when the skip reproduction process is a frame fast-forward reproduction process, the present decoding position is a present key frame, the skip interval is a positive offset, and the skip reproduction processing unit repeats a plurality of times a process of defining a position isolated by the positive offset from a position of the present key frame as the intermediate seek position, retrieving the key frame and interpolating the time information to the retrieved key frame and thereby selectively and sequentially output only the key frame.

19. The moving picture reproducing device according to claim 16, wherein, when the skip reproduction process is a rewind reproduction process, the present decoding position is a present key frame and the skip interval is a negative offset, and the skip reproduction processing unit repeats a plurality of times a process of defining a position isolated by the negative offset from a position of the present key frame as the intermediate seek position, retrieving the key frame and interpolating the time information to the retrieved key frame and selectively and sequentially outputs only the key frame.

20. A computer readable medium selected from one of magnetic storage media and optical storage media, and encoded with a computer readable code controlling a computer to control : a time information interpolation processing unit to count a number of frames from a first frame up to a second frame, and to interpolate time information for a key frame based on time information of the first frame and the counted number of frames, and a decoding unit to decode and output the moving picture data based on the interpolated time information of the key frame, wherein the first frame appears toward a positive direction of a time axis from a predetermined intermediate seek position in the data stream, and the second frame appears after the key frame, with the key frame not having time information and appearing toward the positive direction of the time axis from the intermediate seek position.

21. A moving picture reproducing method for reproducing an inputted data stream of moving picture data comprised of a plurality of frames, comprising:
Interpolating time information by counting up a number of frames from a first frame up to a second frame, the first frame having time information and appearing toward a positive direction of a time axis from a predetermined intermediate seek position in the data stream, with the second frame not having time information and appearing after a key frame, the key frame appearing toward the positive direction of the time axis from the intermediate seek position, and interpolating the time information for the key frame based on the time information of the first frame and the counted number of frames.

22. A computer readable medium selected from one of magnetic storage media and optical storage media, and encoded with computer readable code controlling a computer to control the execution of a method of for: interpolating time information by counting up a number of frames from a first frame up to a second frame, the first frame having time information and appearing toward a positive direction of a time axis from a predetermined intermediate seek position in the data stream, with the second frame not having time information and appearing after a key frame, the key frame appearing toward the positive direction of the time axis from the intermediate seek position, and interpolating the time information for the key frame based on the time information of the first frame and the counted number of frames.

23. A computer readable medium selected from one of magnetic storage media and optical storage media, and encoded with a computer program controlling a computer to execute a moving picture reproduction operation for an inputted data stream of moving picture data comprised of a plurality of frames, the moving picture reproduction process comprising:
interpolating time information by counting up a number of frames from a first frame up to a second frame, the first frame having time information and appearing first toward a positive direction of a time axis from a predetermined intermediate seek position in the data stream, with the second frame not having time information and appearing after a key frame, the key frame appearing toward the positive direction of the time axis from the intermediate seek position, and interpolating the time information for the key frame based on the time information of the first frame and the counted number of frames.

24. A reproducing device for a data stream, comprising:
- an interpolation processing unit to interpolate a predetermined time information for a key frame, of the data stream, based on time information of a reference frame, of the data stream and different from the key frame, and a counted number of frames between the reference frame and another frame of the data stream; and
- a decoding processing unit to output decoded video frames of the data stream, for an intermediate seek position of the data stream, based on the interpolated time information for the key frame.

25. The reproducing device of claim 24, wherein the key frame is an I picture frame first appearing toward a positive direction of the time axis from the intermediate seek position.

26. The reproducing device of claim 24, wherein the reference frame is a P picture frame.

27. The reproducing device of claim 24, wherein the reference frame is a B picture frame.

28. The reproducing device of claim 24, wherein the time information is PTS code information.

29. A computer readable medium selected from one of magnetic storage media and optical storage media, and encoded with a computer readable code controlling a computer to control: an interpolation processing unit to interpolate a predetermined time information for a key frame, of the data stream, based on time information of a reference frame, of the data stream and different from the key frame, and a counted number of frames between the reference frame and another frame of the data stream; and a decoding processing unit to output decoded video frames of the data stream, for an intermediate seek position of the data stream, based on the interpolated time information for the key frame.

* * * * *

UNITED STATES PATENT AND TRADEMARK OFFICE
CERTIFICATE OF CORRECTION

| | | |
|---|---|---|
| PATENT NO. | : 7,352,959 B2 | Page 1 of 1 |
| APPLICATION NO. | : 10/629739 | |
| DATED | : April 1, 2008 | |
| INVENTOR(S) | : Koichiro Yamashita | |

It is certified that error appears in the above-identified patent and that said Letters Patent is hereby corrected as shown below:

Column 22, Line 35, after "method" delete "of".

Signed and Sealed this

Twenty-sixth Day of August, 2008

JON W. DUDAS
*Director of the United States Patent and Trademark Office*